(12) United States Patent
Ray (10) Patent No.: US 7,477,239 B2
(45) Date of Patent: Jan. 13, 2009

(54) RECONFIGURABLE LIGHTED KEYPAD

(75) Inventor: Elton T. Ray, Lakeville, NY (US)

(73) Assignee: Xerox Corporation, Norwalk, CT (US)

( * ) Notice: Subject to any disclaimer, the term of this patent is extended or adjusted under 35 U.S.C. 154(b) by 517 days.

(21) Appl. No.: 10/975,398

(22) Filed: Oct. 29, 2004

(65) Prior Publication Data

US 2006/0114236 A1  Jun. 1, 2006

(51) Int. Cl.
*G06F 3/02* (2006.01)
*G09G 5/00* (2006.01)

(52) U.S. Cl. .................................. 345/172; 345/170
(58) Field of Classification Search ............ 345/170, 345/172, 82–83, 156, 168–169, 171, 173–178
See application file for complete search history.

(56) References Cited

U.S. PATENT DOCUMENTS

| | | | |
|---|---|---|---|
| 3,756,693 A | 9/1973 | Ota | |
| 4,143,103 A | 3/1979 | Sheridon | |
| RE31,498 E | 1/1984 | Te Velde | |
| 5,389,945 A | 2/1995 | Sheridon | |
| 5,482,896 A | 1/1996 | Tang | |
| 5,530,269 A | 6/1996 | Tang | |
| 5,532,550 A | 7/1996 | Adler | |
| 5,604,027 A | 2/1997 | Sheridon | |
| 5,719,589 A | 2/1998 | Norman et al. | |
| 5,862,395 A | 1/1999 | Bier | |
| 5,867,149 A * | 2/1999 | Jaeger | 345/172 |
| 6,147,791 A | 11/2000 | Sheridon | |
| 6,198,220 B1 * | 3/2001 | Jones et al. | 313/512 |
| 6,262,707 B1 | 7/2001 | Sheridon | |
| 6,348,908 B1 | 2/2002 | Richley et al. | |
| 6,366,747 B1 | 4/2002 | Roller | |
| 6,424,092 B1 | 7/2002 | Odake et al. | |
| 6,497,942 B2 | 12/2002 | Sheridon et al. | |
| 6,573,880 B1 | 6/2003 | Simoni et al. | |
| 6,650,045 B1 * | 11/2003 | Forrest et al. | 313/504 |
| 6,653,543 B2 | 11/2003 | Kulas | |
| 6,727,645 B2 | 4/2004 | Tsujimura et al. | |
| 6,798,359 B1 * | 9/2004 | Ivancic | 341/23 |

* cited by examiner

*Primary Examiner*—Amr Awad
*Assistant Examiner*—Michael Pervan
(74) *Attorney, Agent, or Firm*—Oliff & Berridge, PLC (57) ABSTRACT

A dynamically reconfigurable input button display provided on an operational face of multi-function physically displaceable buttons allows easy dynamic display of various operating modes or functions associated with operation of the button. The button forms part of a user interface of a input device, such as a piece of office equipment or a hand-held electronics device. The buttons may form an array in which a plurality of discrete functionality displays are provided on each of the buttons. The display is a thin film device, such as an organic LED display.

12 Claims, 8 Drawing Sheets

*RELATED ART*

RECONFIGURABLE LIGHTED KEYPAD

BACKGROUND OF THE INVENTION

1. Field of Invention

A dynamically reconfigurable button display provided on an operational face of multi-function physically displaceable buttons allows easy dynamic display of various operating modes or functions associated with operation of the button.

2. Description of Related Art

Figure 1:
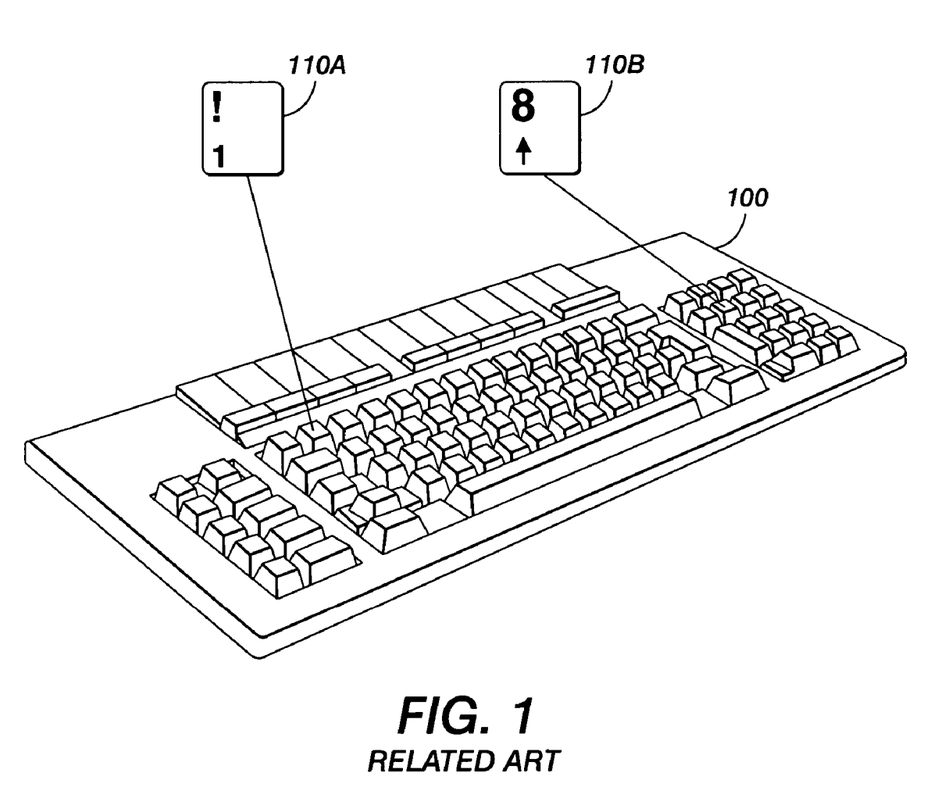
FIG. 1 illustrates a conventional keypad, keyboard or input device having one or more physically displaceable buttons.

Reconfigurable controls are known per se. For example, conventional computer keyboards and keypads, such as those illustrated in FIG. 1, are capable of performing multiple operations (e.g., a computer keypad button is able to operate as either a numeric keypad or as a cursor control, depending on a mode of operation). However, a single label often will not suffice to describe all of the different contexts or modes of functionality of the button in order to inform a user as to the capability and functionality of the individual buttons.

One specific example is the "8" key (element 110B) on a standard keyboard keypad 100. It is usually associated with a first function that provides an "8" at the current cursor position. However, when a "Num Lock" button is deactivated, the "8" button functions as an up cursor button that positions the cursor on an associated display screen one row upwards. Similarly, conventional keyboards are capable of having individual buttons achieve multiple operating functions. For example, the "1" key (element 110A) operates to designate either a "1" or a "!" depending on whether the "shift" key is activated. Function keys on a conventional keyboard, such as the "F1" key, often have many more variations in function, often depending on the particular software being run.

In either of the first two above examples, it has been conventional to print both functions on the operating face of the keyboard/keypad buttons (as shown). However, such static display presentation has severe drawbacks, particularly if more than two function are necessary, as in the third example. Static display also does not suffice when a dynamic reconfiguration of button functionality is desired. One such drawback is the inability to further reconfigure the button without a corresponding substitution of a button component, e.g., a keyboard button having the correct new functionality printed on its operating face to enable the user to properly use the new function. Also, when more than two functions are provided, printing of all functions on the button is either impractical or at least undesirably confusing to a user.

Figure 2:
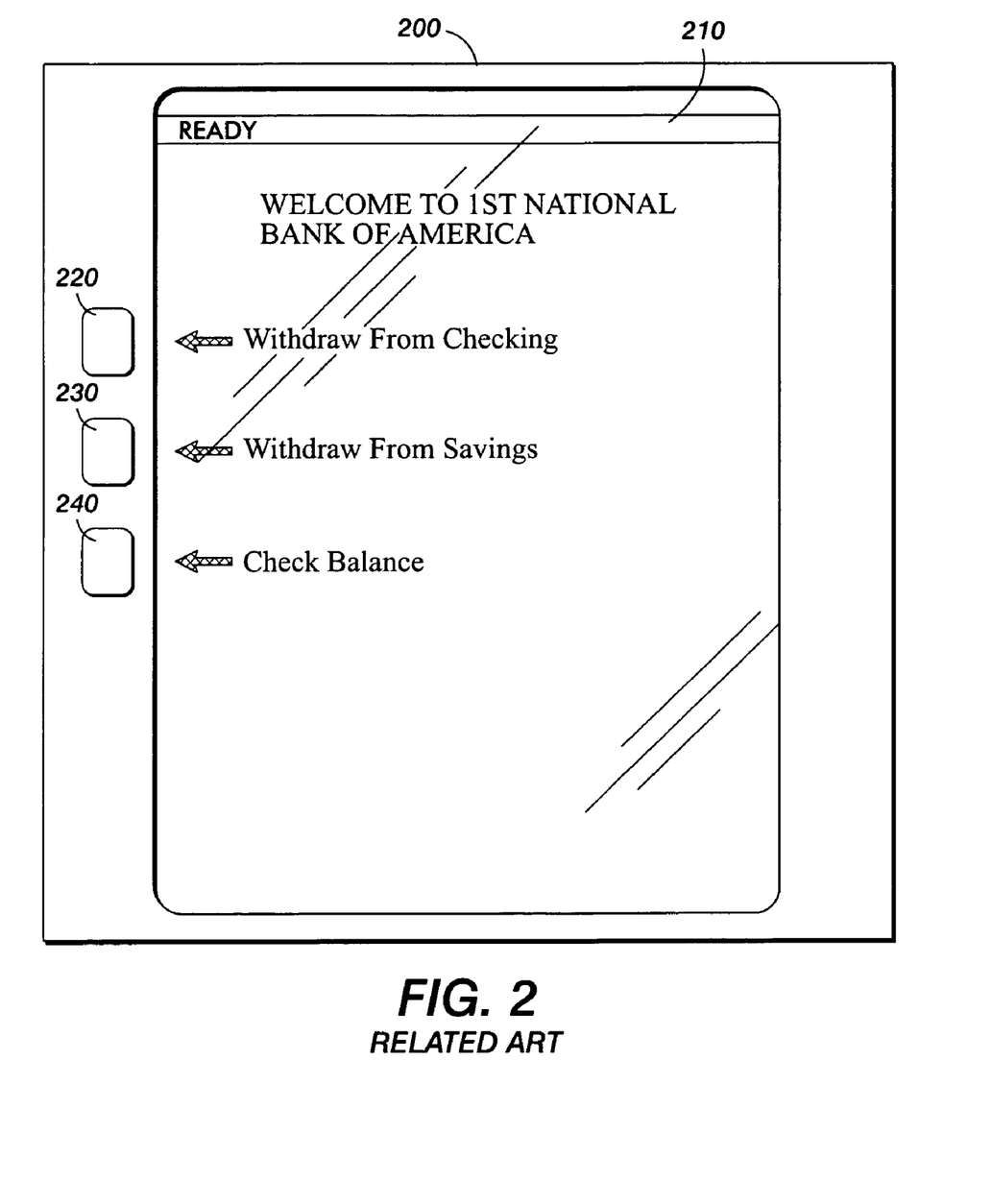
FIG. 2 illustrates a conventional ATM machine having a display screen and discrete buttons offset from the display.

Many consumer electronic devices have some manner of digital display coupled with one or more buttons that can take on one or more functions depending on the context or selected mode of operation of the device. Known alternatives to the above have chosen to display little or no functionality on the button itself, but instead have the functionality separately displayed on the remote display screen. Many conventional ATM machines currently operate on this methodology. An example is shown in FIG. 2, in which an ATM machine 200 includes a display screen 210 and a series of physically displaceable buttons 220, 230 and 240. Functionality of the buttons 220-240 is displayed on screen 210 in proximity to the corresponding buttons 220-240. Other known alternatives are to provide a hardcopy display formed on a separate template or user guide that also is remote from the keypad itself.

These alternatives create their own problems, by requiring either learned knowledge or memorization of the new (or old) functionality by a user, or viewing of a remote listing or display of all of a plurality of features for a particular button. None of these latter options are highly user friendly or readily adaptable to a dynamically changing button operation. Moreover, such alternatives are difficult to operate due to the functionality being displayed remotely from the button itself. This requires a training of a user's eye on the functionality and then a training of the eye back to the button to operate it.

Figure 3:
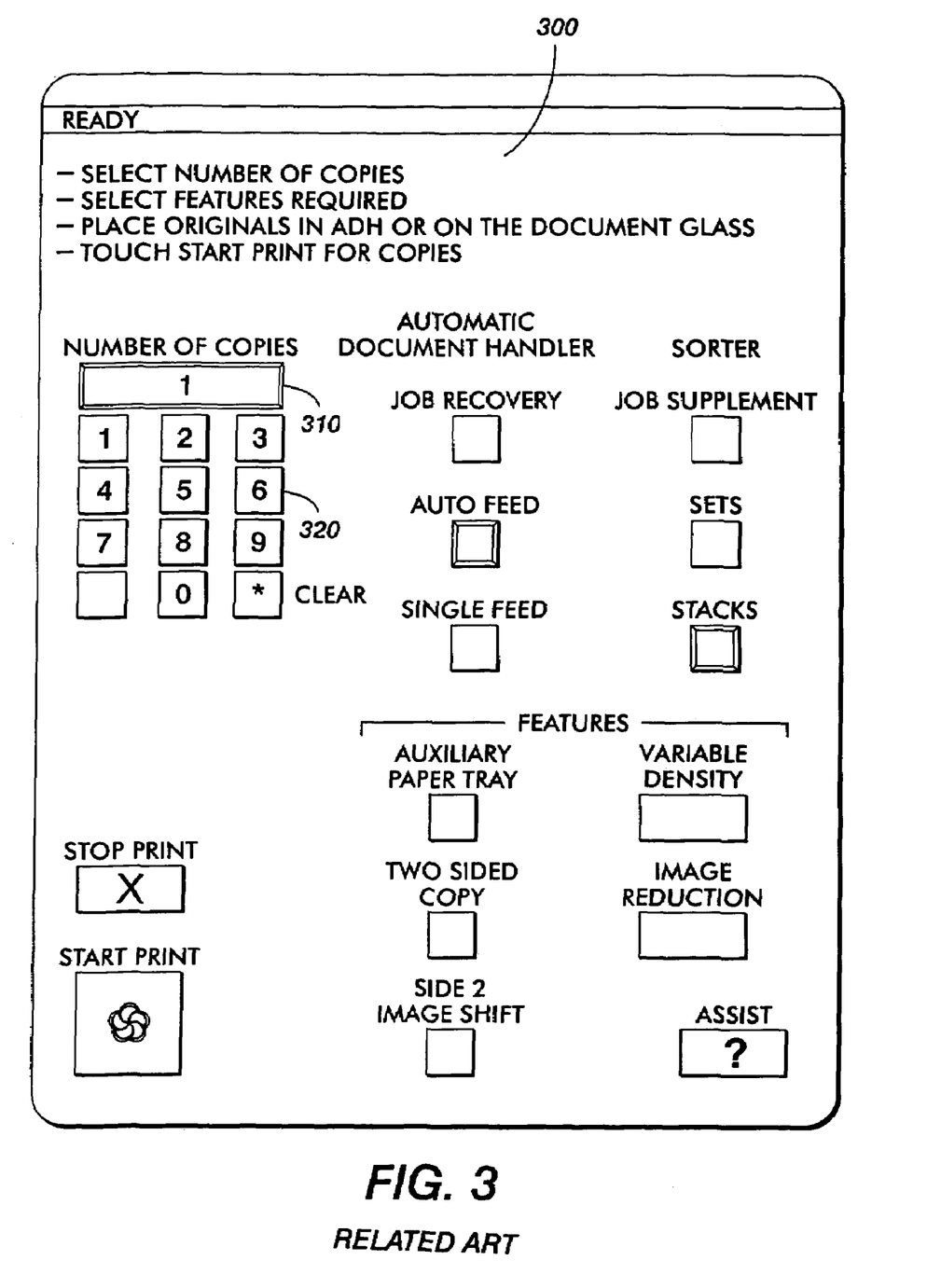
FIG. 3 illustrates a conventional touch screen display having one or more touch screen icons that can be dynamically changeable.
Figure 4:
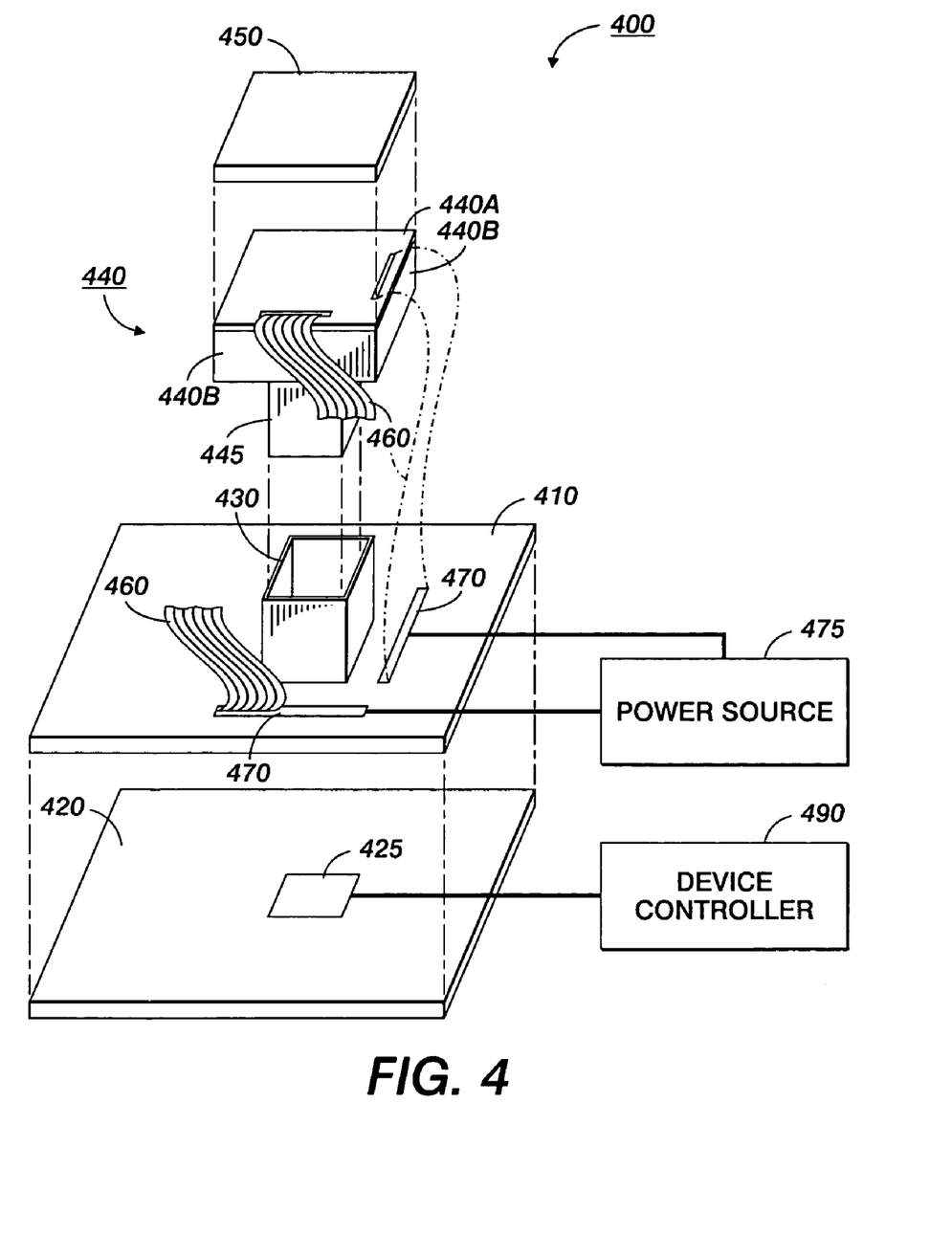
FIG. 4 illustrates an exploded view of an exemplary keypad button of a user interface according to the invention.

A known alternative reconfigurable control is achieved through touch screen displays. That is, rather than providing a physically displaceable (e.g., mechanically actuated) button separate from a display screen of the device, part of the device's display itself forms a control function by being touch sensitive. One exemplary conventional touch screen is illustrated in FIG. 3, in which a touch screen 300 includes a series of icons 310, 320, etc. that can be touched to activate a particular function. Such conventional touch screens are capable of reconfiguration to accommodate different functionality. However, touch screens also are prone to many problems. They are subject to wear and tear. They also are not ergonomic, and typically require more force to operate. Touch screens further do not lend themselves to rapid, repetitive keystrokes. This reduces productivity. Moreover, it is often mentally taxing to operate a touch screen. This is partially because touch screens provide minimal sensitivity feedback to a user, particularly to a user accustomed to depressing of a manual, physically displaceable button, e.g., a mechanical keypad button. Thus, it is often difficult to assess whether a touch screen button has been properly depressed without looking for or hearing other perceptible clues, such as a display change or audible queue. Accordingly, touch screens are more difficult to assess than the tactile sensation of depressing a physically displaceable button.

Additionally, touch screens often take up much needed display space, reducing the overall functionality of the display itself. For example, in the illustrated touch screen of FIG. 3, nearly the entire device display screen (this example being for a copier), is occupied by the on-screen touch screen buttons.

SUMMARY OF THE INVENTION

Aspects of the invention provide systems and methods for providing a dynamically reconfigurable display on a physically displaceable (e.g., mechanical) button.

Aspects of the invention separately provide a reconfigurable keypad comprising one or more physically displaceable buttons, in which a dynamically reconfigurable label indicating the mode of operation is provided directly on an operational face of each of the buttons.

In various exemplary embodiments of the systems and methods of the invention, the dynamically reconfigurable display is an LED display or other thin film device.

In a preferred embodiment of the systems and methods of the invention, the dynamically reconfigurable display is an organic LED display.

In various exemplary embodiments, the display is an array of display elements.

In various exemplary embodiments, the dynamically reconfigurable display and input button may be provided in a user interface of a consumer electronics device.

In various other exemplary embodiments of the systems and methods of the invention, the dynamically reconfigurable display and input button may be provided on a user interface for office equipment.

Various aspects of the invention are achieved by a user interface for a device having an integrated input button and input function display. The interface includes at least one physically displaceable input button (e.g., mechanical button) and a dynamically reconfigurable display operatively provided on the at least one input button. The input button is operatively coupled to a device controller to actuate at least one device function through displacement of the at least one displaceable input button by a user of the device. The display is operatively provided on the at least one input button and externally viewable by the user. The display is dynamically reconfigured to display indicia indicating input button functionality.

BRIEF DESCRIPTION OF THE DRAWINGS

Various exemplary embodiments of this invention will be described in detail, with reference to the following figures, wherein.

DETAILED DESCRIPTION OF PREFERRED EMBODIMENTS

A first embodiment of the invention will be described with reference to FIGS. 4-7, which show an exemplary reconfigurable keypad 400 having at least one physically displaceable button 440 and an integrated dynamically reconfigurable display 450. The button is used as an input mechanism for an electronic device in which one or more of such buttons are provided. The keypad 400 includes, as mentioned, at least one physically-displaceable button 440 and a dynamically reconfigurable display 450 that is operatively provided on a surface of the button 440, such as on an operational face 440A that receives an actuating force to depress the button. Alternatively, the display may be embedded within the button 440 and visible from at least one surface of button 440. If the operational face is transparent or translucent, the display may be provided internally within the button, so long as it is viewable externally by a user of the user interface.

Figure 5:
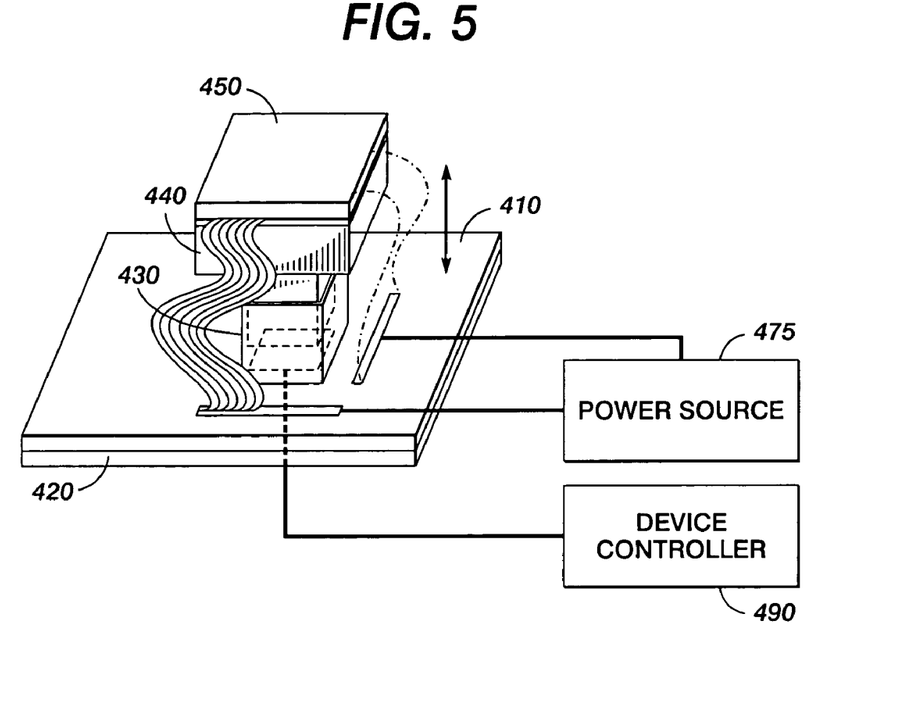
FIG. 5 illustrates the keypad button of FIG. 4 in an assembled state.

The keypad button 440 can take many conventional or subsequently developed forms capable of physical displacement to activate an input or selection feature associated with the button. The exemplary form shown is comparable to that provided on a typical computer keyboard. It includes a base substrate 410 on which a circuit board 420 is mounted. Alternatively, the circuit board itself may form the base substrate 410. A button receiving cavity 430 may be provided on base substrate 410 to receive a base 445 of button 440. Circuit board 420 may include various circuits, including an input contact device 425, such as a contact pad, activated by physical manipulation of button 440 (e.g., up/down movement as shown in FIG. 5) such that the button either contacts or comes in close proximity to contact device 425 to activate a desired operational input function controlled by, for example, a device controller 490.

The dynamically reconfigurable display 450 is operatively mounted on button 440, preferably on top surface 440A, such that the operational face (440A) is provided with a display for indicating the mode(s) of operation for the multi-functional or reconfigurable button 440. Operative mounting can be through conventional mounting mechanisms, including for example, bonding, fixing, adhesives, snap-locking, Velcro, gluing, friction fitting, interlocking fit, etc. Display 450 can be operatively connected to a power source/driving device 475 through suitable electrical, optical, inductive or magnetic coupling connections. One example is connection through electrical leads 460 connected to electrical pads 470 provided on either substrate 410 or circuit board 420.

The display 450 is preferably a thin display device, such as an LED, LCD, or EL (electro luminescence) display, each of which are well known and can be made with sufficiently thin configurations, on the order of several millimeters or smaller. Examples of such conventional display devices include U.S. Reissue Patent No. RE31,498 to Te Velde, and U.S. Pat. No. 3,756,693 to Ota.

Organic LEDs are preferable to conventional LEDs because they do not require a backlit source, allowing for a simpler and thinner structure. Organic LEDs can be fabricated inexpensively in very small sizes. Organic LEDs also have advantages that they can provide a suitably wide viewing angle and generate sufficient light output for use in various ambient light situations. Examples of suitable organic LEDs include those of U.S. Pat. No. 6,424,092 to Odake et al., U.S. Pat. No. 6,727,645 to Tsujimura et al., U.S. Pat. No. 5,530,269 to Tang, U.S. Pat. No. 5,482,896 to Tang, U.S. Pat. No. 5,719,589 to Norman et al., and/or U.S. Pat. No. 5,532,550 to Adler, the disclosures of which are incorporated herein by reference in their entireties.

In the above examples, the display forms a lighted display. However, other dynamically reconfigurable thin displays could be used, such as for example, Gyricon bead displays. Examples of Gyricon bead displays include U.S. Pat. No. 6,573,880 to Simoni et al., U.S. Pat. No. 6,497,942 to Sheridon et al., U.S. Pat. No. 6,348,908 to Richley et al., U.S. Pat. No. 6,147,791 to Sheridon, U.S. Pat. No. 6,262,707 to Sheridon, U.S. Pat. No. 5,389,945 to Sheridon, U.S. Pat. No. 5,604,027 to Sheridon, and U.S. Pat. No. 4,143,103 to Sheridon, the disclosures of which are incorporated herein by reference in their entireties.

Figure 6:
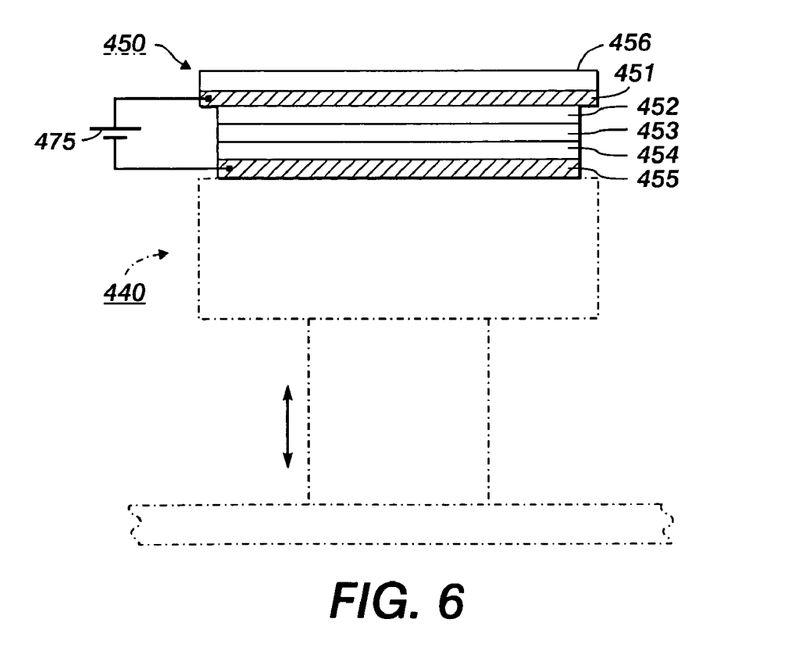
FIG. 6 illustrates a cross-sectional view of the button of FIG. 5 showing the various layers of an exemplary display according to the invention.

With reference to FIG. 6, an exemplary organic LED display 450 is disclosed. Organic LED 450 includes an anode electrode 451 formed as a stripe and serving as a column electrode formed on a base substrate 456, an organic substrate formed of an organic positive hole transport layer 452, an organic light emission layer 453, and an organic electron transport layer 454. A row electrode 455 formed as a stripe perpendicular to the orientation of electrode 451 is formed on the electron transport layer 454. When a voltage is applied between the column electrode 451 and the row electrode 455 through wiring 457, light is observed through the base substrate 456. Base substrate 456 is preferably transparent or translucent so that the light from the display can be viewed. Additionally, base substrate 456 preferably forms a protective cover to protect the display. Such a protective cover may be rigid. Alternatively, after assembly, the base substrate layer 456 could be removed so that the display itself forms an exterior surface of the input button.

Thus, the column electrode and the row electrode are useable as a signal electrode and a scanning electrode to display a desired image using each intersecting point of the column electrode and row electrode as a pixel from a suitable driving circuit. Display 450 is shown exaggerated in scale for illustration purposes. In actual use, it would typically have a thickness on the order of several millimeters or smaller. Accordingly, the thickness of the display 450 is negligible relative to the size of button 440. Organic LED display 450 is mounted on the operational surface of keypad button 440.

Figure 7:
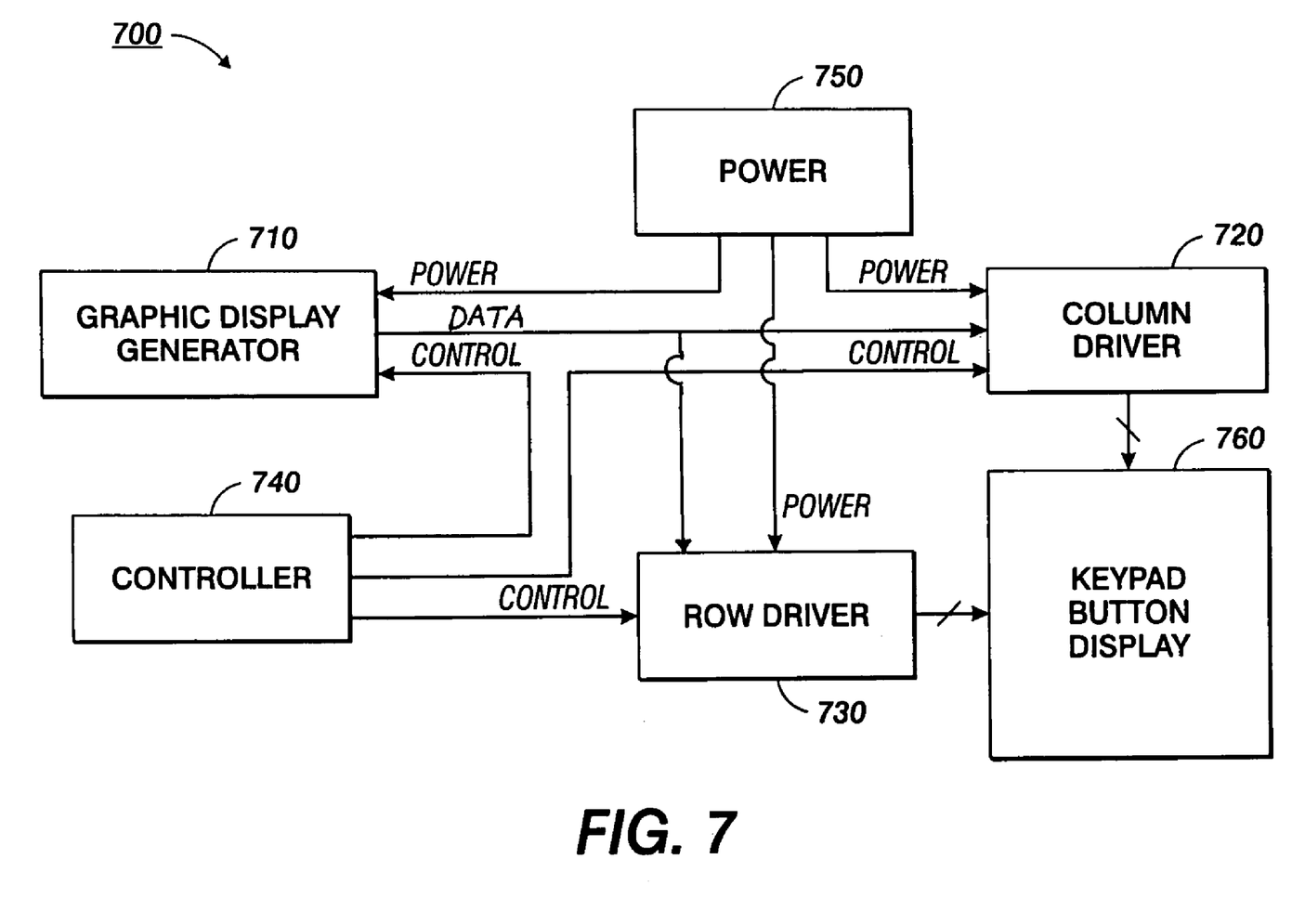
FIG. 7 illustrates an exemplary circuit diagram capable of dynamically reconfiguring the display according to the invention.

An exemplary driving circuit diagram for operating the display device 450 of the button 440 will be described with reference to FIG. 7. Driving circuit 700 includes a graphic display generator 710 that generates and/or receives from a suitable source a display signal, column driver 720, row driver 730, controller 740, power source 750, keypad button display 760 (corresponding to display 450) and associated power, control and data lines. The controller 740 controls generator 710, column driver 720 and row driver 730 as known in the art to power predetermined row/column pixels of the display 760 in order to provide a dynamically changeable display that corresponds to the functionality of the button on which the display 760 is provided.

Figure 8:
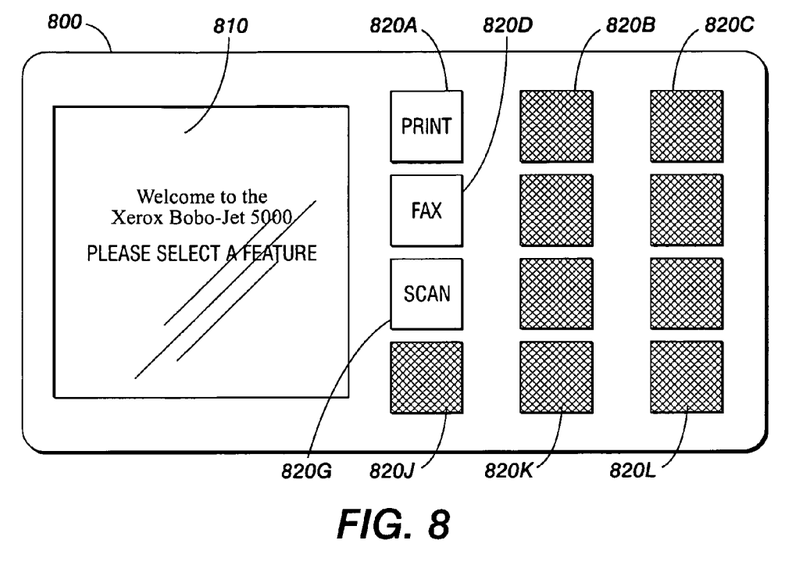
FIG. 8 illustrates a user interface of an exemplary office equipment device including a user interface display and a series of reconfigurable physically displaceable buttons with discrete button functionality displays according to a first mode of operation in accordance with an exemplary embodiment of the invention.
Figure 9:
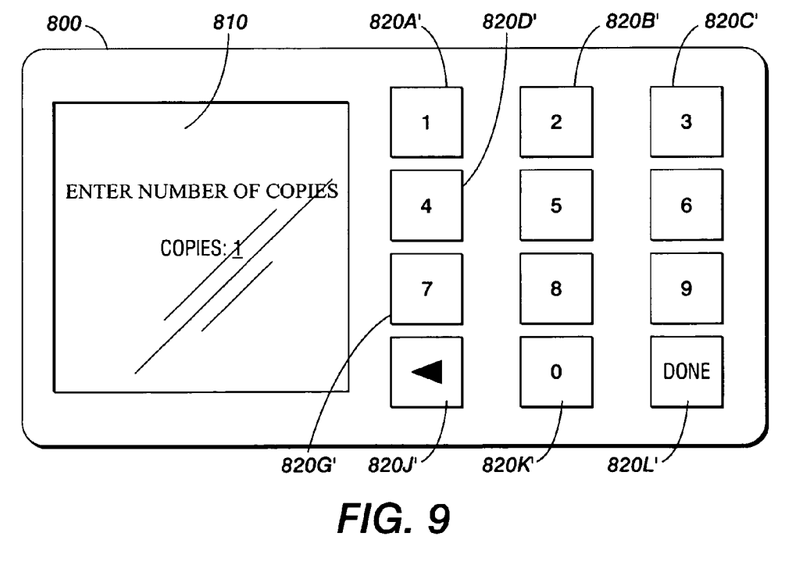
FIG. 9 illustrates the functionality displays and buttons of FIG. 8 in a second mode of operation in accordance with an exemplary embodiment of the invention.
Figure 10:
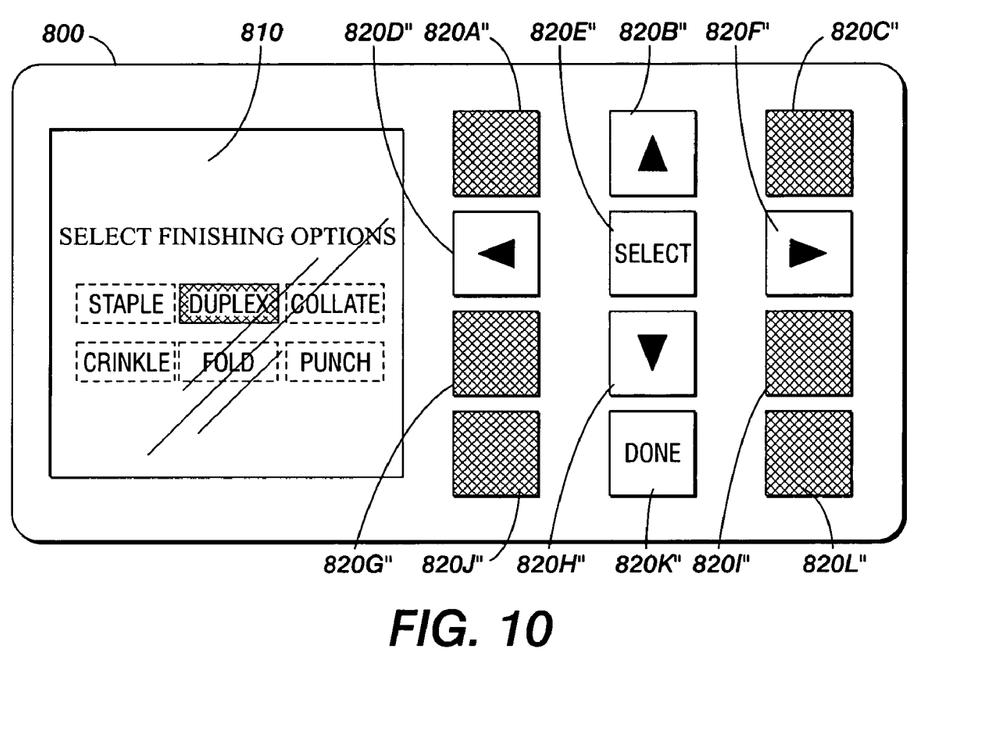
FIG. 10 illustrates the functionality displays and buttons of FIG. 8 in a third mode of operation in accordance with an exemplary embodiment of the invention.

An embodiment of the invention in typical use will be described with reference to FIGS. 8-10. In FIGS. 8-10, an electronic device 800 is provided with an optional display screen 810. Various ones or all of a plurality of physically manipulatable keypad buttons 820A-L are provided with a discrete, dynamically reconfigurable display on an operational face of the keypad buttons. This exemplary embodiment is particularly suitable as a user interface for a piece of office equipment, such as a printer, copier, facsimile machine, or multifunction device. However, the electronic device 800 can be any device having physically displaceable buttons or keypads. Non-limiting examples include, ATM machines, cash registers, telephones, cellular phones, calculators and other hand-held electronics devices, kiosks, medical devices, appliances, computer keyboards or keypads, key fobs, equipment remote controls, game controllers, etc.

In FIG. 8, a user can select an appropriate function of the device using buttons 820A, 820D or 820G. In this example, other buttons are currently unassigned and are inoperable. Upon selection of a desired machine functionality (such as a print function), the keypad buttons 820A-L are dynamically reconfigured to achieve a different functionality related to the selected operation (printing) as shown in FIG. 9. For example, buttons 820A'-L' can be configured as a numeric keypad device to select a number of copies to make. In this exemplary embodiment, optional display 810 can be integrated with the keypad to supplement the functionality of the keypad by illustrating the number of copies selected. However, operation of the buttons does not require use of the display 810, which is the main display for the device. Thus, with the exemplary electronic device 800, the keypad buttons 820A-L themselves are dynamically changeable to display the current functionality of each button directly on the button.

Upon selection of a suitable number of copies to make, the keypad buttons 820A"-L" can be again dynamically reconfigured to achieve different functionality as shown in FIG. 10, such as a desired finishing operation to be performed by the electronic device 800, which in this example is a multifunction copy device. In this FIG. 10 example, buttons 820B", 820D", 820F" and 820H" serve as directional buttons that scroll a cursor along the display 810 to select an appropriate finishing operation. Button 820E" can select the desired function, and button 820K" signals that this operation is complete. It will be apparent that this is merely a non-limiting exemplary embodiment of dynamic reconfigurability.

While this invention has been described in conjunction with the exemplary embodiments outlined above, various alternatives, modifications, variations, and/or improvements, whether known or that are, or may be, presently unforeseen, may become apparent. Accordingly, the exemplary embodiments of the invention as set forth above are intended to be illustrative, not limiting. Various changes may be made without departing from the spirit and scope of the invention. Therefore, the systems and methods according to this invention are intended to embrace all known, or later-developed, alternatives, modifications, variations, and/or improvements.

What is claimed is:

1. A user interface with integrated input button and input function display for a device, comprising:

at least one physically displaceable input button operatively coupled to a device controller, the input button including a key pad button having a top surface forming an operational face that indirectly receives an actuating force from a user to actuate at least one device function through displacement of the at least one displaceable input button; and a dynamically reconfigurable display operatively mounted on top of the top surface of the at least one input button and externally viewable by the user, the display being dynamically reconfigured to display indicia indicating input button functionality, wherein the display is a thin film organic LED display device provided on the operational face of the input button and directly receives the actuating force from the user.

2. The user interface according to claim 1, wherein the display covers substantially the entire operational face of the input button.

3. The user interface according to claim 1, wherein the display is a lighted display.

4. The user interface according to claim 1, wherein the device is an office equipment device.

5. The user interface according to claim 4, wherein the office equipment is selected from the group consisting of a copier, printer, and facsimile device.

6. The user interface according to claim 1, wherein the device is a hand-held electronics device.

7. The user interface according to claim 1, wherein the at least one input button has a plurality of different functionality modes and the display is dynamically reconfigurable to reflect the current functionality of the at least one input button.

8. The user interface according to claim 7, wherein the user interface includes a plurality of physically displaceable input buttons, and a plurality of discrete dynamically reconfigurable displays are provided, one for each of the plurality of physically displaceable input buttons.

9. A user interface with integrated input button and input function display for a device, comprising:

at least one physically displaceable input button operatively coupled to a device controller, the input button including a key pad button having a top surface forming an operational face that indirectly receives an actuating force from a user to actuate at least one device function through displacement of the at least one displaceable input button; and a thin film dynamically reconfigurable organic LED display operatively mounted on top of the top surface of the at least one physically displaceable input button to directly receive the actuating force, the display being externally viewable by the user and dynamically reconfigured to display indicia indicating input button functionality and covers substantially the entire operational face of the input button, wherein the organic LED display includes a transparent or translucent base substrate, separate from the input button, that directly receives the actuating force from the user, an anode electrode serving as a column electrode provided immediately below the base substrate, an organic substrate forming an organic positive hole transport layer below the column electrode, an organic light emission layer formed below the hole transport layer, an organic electron transport layer formed below the organic light emission layer, and a row electrode oriented perpendicular to the anode electrode formed below the organic electron transport layer.

10. The user interface according to claim 9, wherein the device is an office equipment device.

11. The user interface according to claim 10, wherein the office equipment is selected from the group consisting of a copier, printer, and facsimile device.

12. The user interface according to claim 9, wherein the device is a hand-held electronics device.

* * * * *